(12) United States Patent
Vercier et al.

(10) Patent No.: US 12,196,576 B2
(45) Date of Patent: Jan. 14, 2025

(54) METHOD FOR CALIBRATING A VIBRATING INERTIAL SENSOR

(71) Applicant: THALES, Courbevoie (FR)

(72) Inventors: Nicolas Vercier, Valence (FR); Bernard Chaumet, Valence (FR); Bertrand Leverrier, Valence (FR)

(73) Assignee: THALES, Courbevoie (FR)

( * ) Notice: Subject to any disclaimer, the term of this patent is extended or adjusted under 35 U.S.C. 154(b) by 176 days.

(21) Appl. No.: 18/012,963

(22) PCT Filed: Jun. 18, 2021

(86) PCT No.: PCT/EP2021/066712
§ 371 (c)(1),
(2) Date: Dec. 26, 2022

(87) PCT Pub. No.: WO2022/017699
PCT Pub. Date: Jan. 27, 2022

(65) Prior Publication Data
US 2023/0251107 A1     Aug. 10, 2023

(30) Foreign Application Priority Data

Jul. 24, 2020   (FR) .................................... 2007755

(51) Int. Cl.
*G01C 25/00*   (2006.01)
*G01C 19/574*   (2012.01)

(52) U.S. Cl.
CPC ......... *G01C 25/005* (2013.01); *G01C 19/574* (2013.01)

(58) Field of Classification Search
CPC .................... G01C 19/574; G01C 19/5726
See application file for complete search history.

(56) References Cited

U.S. PATENT DOCUMENTS

| | | | |
|---|---|---|---|
| 9,927,256 B2 | 3/2018 | Rosellini et al. | |
| 2013/0204565 A1 | 8/2013 | Rosellini et al. | |
| 2015/0377621 A1* | 12/2015 | Chaumet | G01C 19/5747 73/504.16 |
| 2016/0231118 A1* | 8/2016 | Trusov | G01C 19/5726 |

FOREIGN PATENT DOCUMENTS

EP     2 960 625 A1     12/2015

* cited by examiner

Primary Examiner — Lisa M Caputo
Assistant Examiner — Cynthia L Davis
(74) Attorney, Agent, or Firm — BakerHostetler

(57) ABSTRACT

A method for calibrating an inertial angular sensor includes: for at least two electrical angles of the vibration wave, applying, via each of the three trim controls, a sinusoidal stiffness disturbance having a disturbance frequency, and for each applied disturbance, determining and storing an estimated excitation force to be applied to the resonator in the presence of the stiffness disturbance, on the basis of excitation controls determined by the servo controls; determining, on the basis of the three estimated excitation forces, three 2×2 matrices, being representative of the response of the gyrometer to the stiffness disturbance; determining and storing an estimated inverse excitation matrix and an estimated inverse detection matrix on the basis of the three matrices, an excitation matrix and a detection matrix being respectively representative of effects of the excitation chain and of effect of the detection chain of the sensor.

12 Claims, 10 Drawing Sheets

METHOD FOR CALIBRATING A VIBRATING INERTIAL SENSOR

CROSS-REFERENCE TO RELATED APPLICATIONS

This application is a National Stage of International patent application PCT/EP2021/066712, filed on Jun. 18, 2021, which claims priority to foreign French patent application No. FR 2007755, filed on Jul. 24, 2020, the disclosures of which are incorporated by reference in their entirety.

FIELD OF THE INVENTION

The field of the invention is that of vibrating inertial sensors in which two masses are vibrated. The invention more particularly relates to inertial sensors of the MEMS type having a planar structure, which are typically micromachined from a support wafer.

BACKGROUND

Tuning fork inertial sensors are known to those skilled in the art. Inertial sensors micro-machined from a thin planar wafer, allowing the measurement of an angular position (gyroscope) or of an angular velocity (gyrometer), are described in document EP2960625. The main features thereof are recalled below.

The manufacture of these micro-machined sensors, also referred to as MEMS (Micro-Electro-Mechanical-Systems) sensors, uses techniques of collective micro-machining, etching, doping depositions, etc., similar to those which are used for the manufacture of electronic integrated circuits, allowing low production costs.

These sensors consist of two vibrating mobile masses M1 and M2, illustrated in FIG. 1, that are disposed one around the other (concentric) and that are excited in vibration in tuning fork mode in the plane of the wafer (plane xy in the figure) via one or more excitation transducers. The two masses are suspended from fixed anchor points A of the wafer by (orthotropic) suspension springs RS. The two masses are coupled together by stiffness elements RC. The aim is to obtain, by construction, a stiffness along x that is equal to a stiffness along y, and a zero coupling stiffness between x and y. The useful vibration mode corresponds to a linear vibration of the two masses in phase opposition.

This architecture forms a resonant system with two masses coupled together by the Coriolis acceleration. When the gyrometer rotates about the axis z, termed sensitive axis, perpendicular to the plane xy, the composition of the forced vibration with the angular rotation vector produces, through the Coriolis effect, forces which set the mobile masses into natural vibration perpendicularly to the excitation vibration and to the sensitive axis; the amplitude of the natural vibration is proportional to the rotation speed. The electronics associated with the sensor calculate the amplitude of the vibration along the direction orthogonal to the direction of excitation, whatever the latter is (known by assumption).

The sensor can operate in gyrometer mode: the direction of natural vibration is kept fixed with respect to the casing of the sensor by modifying the excitation and the output information is then an image of the necessary energy that must be applied to the excitation transducers in order to keep the direction of natural vibration fixed in spite of the movements of the casing. The measurement of this counterforce provides access to the angular velocity Ω of the sensor. The sensor can also operate in gyroscope mode: the direction of the natural vibration is left free and is detected so as to give the angular orientation of the sensor.

The whole of the structure of the resonator is axisymmetric about two axes x and y defining a sensor reference frame as illustrated in FIG. 2. Axisymmetric is understood to mean that the structure is symmetric with respect to x and symmetric with respect to y. As described below, these axes constitute the main directions of actuators/detectors which operate along these two axes.

To excite the useful vibration mode in any given direction of the plane, the excitation signal is decomposed into two components of adjusted respective amplitudes, applied respectively to the excitation transducer Ex acting along the direction x and to the excitation transducer Ey acting along the direction y, said transducers being associated with at least one mobile mass (inner mass M1 in FIG. 2). Excitation forces are therefore applied to these transducers in order to generate and sustain the vibrating wave: said transducers are able to sustain the forced vibration via an amplitude control (to oppose the damping of the MEMS) and along any direction of the plane xy, via a precession control (to cause the wave to rotate).

The movements of the resulting wave are detected by combining the information gathered by at least one pair of detection transducers Dx, Dy that acquire the position of the mass during its travel in the sensor reference frame xy (two of each in FIG. 2) and that are associated with at least one mobile mass.

Preferably, transducers are embodied on the two masses, as illustrated in FIG. 3, the index 1 corresponding to the mass M1 and the index 2 to the mass M2. FIGS. 2 and 3 constitute non-limiting examples of arrangement; many other types of arrangement are possible, with the constraint of producing an axisymmetric system.

The transducers are preferably embodied by electrodes as interdigitated combs with gap variation. There is a fixed comb, the teeth of which are secured to a fixed electrode of the machined wafer, and a mobile comb, the teeth of which, interdigitated with the teeth of the fixed comb, are secured to the mobile mass associated with the transducer considered.

Excitation consists in applying an excitation force via an alternating voltage between the mobile comb and the fixed comb, at the desired vibration frequency (mechanical resonant frequency of the suspended mobile mass, typically of the order of 10 kHz). The movement produced is perpendicular to the teeth of the comb.

Detection consists in applying a polarization voltage between the fixed comb and the mobile comb and in observing the variations in charge which result from the variations in capacity between the fixed comb and the mobile comb due to the variations in spacing between the teeth of the fixed comb and of the mobile comb. The measured movement is the movement perpendicular to the teeth of the comb.

The vibrating assembly of masses/springs is characterized by a symmetric 2×2 stiffness matrix, termed K. For optimal operation of the sensor, it is sought to obtain a final stiffness matrix proportional to the identity. Due to imperfections in production, this is not the case (see further below).

The axis x' is termed the vibration axis of the wave. This axis defines a reference frame x'y', with y' perpendicular to x' in the plane of the MEMS. The axis x' forms, with the axis x, an angle termed electrical angle θ and the reference frame x'y' is termed wave reference frame. It will be assumed at present that the wave vibrates along x (x'=x).

The dynamic equation describing a vibrating gyrometer can be reduced to a mono-mass model of mass M, the displacement X, Y of which is modeled as follows:

$$M\begin{bmatrix}\ddot{X}\\\ddot{Y}\end{bmatrix}+A\begin{bmatrix}\dot{X}\\\dot{Y}\end{bmatrix}+K\begin{bmatrix}X\\Y\end{bmatrix}+C\begin{bmatrix}\dot{X}\\\dot{Y}\end{bmatrix}=\begin{bmatrix}FX\\FY\end{bmatrix} \quad (1)$$

M is the mass matrix; for the sake of simplicity, this will be considered to be a scalar hereinafter, A is the damping matrix, K is the stiffness matrix, C is the Coriolis matrix and has the value:

$$\begin{bmatrix}0 & -M\Omega\\M\Omega & 0\end{bmatrix}$$

in which M is the mass and $\Omega$ is the angular velocity,

FX and FY are the excitation forces applied along the axis x and the axis y of the gyrometer. These forces come from controls Cr, Ca, Cq and Cp calculated in the wave reference frame by servo controls known to those skilled in the art (and not described here), on the basis of the demodulation of the detected signals relative to the displacement of the vibration. On the basis of the measurements of the movement of the wave X and Y that are carried out in the reference frame xy, a rotation is applied to pass into the wave reference frame x'y', then the controls are determined (via a demodulation of detected signals) and an inverse rotation is applied to pass back into the reference frame xy, in which the excitation forces are applied. The controls are determined such that the displacement of the mass, that is to say the vibration wave of the gyrometer, takes a desired form. Generally, the desired form is a linear displacement oscillating in a given direction with respect to the reference frame xy of the gyrometer:

The control Cr corresponds to the stiffness forces for controlling the natural frequency of the resonator; since phase is the integral of frequency, Cr therefore controls the phase of the wave. Cr is an external force applied to the resonator (estimating the displacement) which modifies the frequency of the vibration, by slowing down or speeding up the vibration when the latter vibrates, but does not modify the intrinsic stiffness of the resonator.

The control Ca corresponds to the amplitude forces for controlling the amplitude of the wave and the control Cp corresponds to the precession forces which make it possible to control the angular velocity of the wave.

The control Cq corresponds to the quadrature forces for controlling the quadrature of the wave (that is to say guaranteeing the linearity of the wave or, when the desired wave is not linear, it is generally elliptical, and Cq makes it possible to control the minor axis of the ellipse).

It is well known to those skilled in the art that the imperfections in production of the sensor lead to errors in the information delivered as output thereof. Most of these imperfections have to be compensated by equilibrating the gyrometer.

It is known to carry out this compensation by removing material locally, for example by laser ablation, so as to modify the distribution of mass or of stiffness. This process is expensive, or even impossible, to implement on a gyrometer which is micro-machined from a thin silicon wafer and the detection and excitation movements of which are situated in the plane of the substrate.

A first type of imperfection underlying the non-identity of the stiffness matrix K is the frequency disparity between the main axis of vibration and the axis perpendicular to the vibration in the plane of the MEMS, corresponding to a stiffness matrix of the system in which the stiffness along the axis x is different from the stiffness along the axis y. It is sought to equalize the resonant frequencies along the two axes mentioned above by means of an adjustable electrostatic stiffness. This electrostatic stiffness, referred to as equalization stiffness, is delivered by frequency adjustment transducers Tx, Ty (at least one pair Tx Ty on at least one mass, see FIG. 2) acting along the directions x and y. The aim of the application of said equalization stiffness is to equalize the stiffnesses along the two axes of the vibration, by reducing the value of the highest stiffness, thus rendering the frequencies equal. The frequency correction is termed "trimming".

A second type of imperfection originates from the mechanical coupling between the axis of the vibration and the perpendicular axis, underlying what is known as quadrature bias. It involves dynamic stiffness anisotropy defects in the assembly of the two vibrating masses, resulting in a vibration that is no longer linear but elliptical, and corresponding to the existence of a non-zero coupling stiffness. A solution known from the prior art is to cancel this term by applying a (sinusoidal) force F to the system via excitation transducers. The problem is that the application of this force is not exerted exactly at the correct moment (phase errors) and in the correct axis (gain error), giving rise to the application of drifts. To avoid application of a force F, the coupling term is physically canceled not by applying a force but by changing the stiffness of the resonator directly via at least one pair of transducers Q+ and Q− as illustrated in FIG. 2 (2 Q+/Q− pairs in FIG. 2). These transducers operating on X and Y are disposed on the diagonals so as to comply with the symmetry and the "geometric" anisotropy, and for reasons of bulk. Correction of the quadrature bias is termed quadrature "trimming" (also "trim"). The transducers Tx, Ty, Q+ and Q− are preferably also interdigitated combs, as illustrated in FIGS. 2 and 3, that are controlled by DC voltages and that are termed trimming combs.

Thus, the transducers for the quadrature "trim" modify the characteristics of the MEMS sensor to eliminate the couplings between the two axes of the wave reference frame, and the transducers for the frequency "trim" modify the characteristics of the MEMS sensor to eliminate the frequency disparities between the two axes of the wave reference frame. They modify the intrinsic characteristics of the resonator. In other words, if the trimming voltage is acted on, even when the resonator is not vibrating, the stiffness thereof is changed, contrary to the control Cr described above which is a force which slows down or speeds up the vibration when the latter vibrates. The trimming is carried out with the aid of a DC or low-frequency voltage which modifies the electrostatic stiffness of the sensor without the phase of the vibration needing to be evaluated, whereas the control Cr is implemented by the sending of a sinusoidal voltage (at the resonant frequency of the sensor) after the phase of the vibration has been estimated. The change in frequency realized by trimming is therefore of a completely different nature than a change in frequency realized by a control Cr.

They are controlled by trim servo controls (known to those skilled in the art) which generate a quadrature trim control CTxy, a frequency trim control along X CTx and a frequency trim control along Y CTy. The trim controls are DC voltages.

Thus, using the trimming combs, the stiffness matrix K is modified directly with the aid of a matrix Kt, and the dynamic equation of the gyrometer is:

$$M\begin{bmatrix}\ddot{X}\\\ddot{Y}\end{bmatrix}+A\begin{bmatrix}\dot{X}\\\dot{Y}\end{bmatrix}+K\begin{bmatrix}X\\Y\end{bmatrix}+C\begin{bmatrix}\dot{X}\\\dot{Y}\end{bmatrix}-Kt\begin{bmatrix}X\\Y\end{bmatrix}=\begin{bmatrix}FX\\FY\end{bmatrix} \quad (2)$$

The comb for trimming frequency along x modifies the stiffness of the resonator by producing a matrix Kt:

$$Kt=\begin{bmatrix}Kx & 0\\0 & 0\end{bmatrix}$$

The comb for trimming frequency along y modifies the stiffness of the resonator by producing a matrix Kt:

$$Kt=\begin{bmatrix}0 & 0\\0 & Ky\end{bmatrix}$$

The quadrature trimming comb modifies the stiffness of the resonator by producing a matrix Kt:

$$Kt=\begin{bmatrix}0 & Kxy\\Kxy & 0\end{bmatrix}$$

The stiffnesses Kx, Ky and Kxy correspond to the controls CTx, CTy and CTxy (DC voltages) to within a gain factor. The controls CTx, CTy and CTxy are voltages which, through the combs, modify the stiffnesses Kx, Ky and Kxy. Application of the trimming controls amounts to modification of the matrix K in the differential equation (2), by transforming K into K-Kt.

FIG. 4 illustrates the operation of an inertial sensor according to the prior art. The resonator Res comprises the various transducers described above and symbolized by Et (excitation), Dt (detection), TQ (quadrature trim) and TF (frequency trim). The vibration wave OV vibrates along X' with an electrical angle θ. A processing unit UT undertakes the various calculations for the servo controls and generates, for the corrections, the set of controls/forces mentioned above in relation to the various transducers. The excitation and trim controls are determined by different servo controls.

In the processing unit, the detected movements X and Y are first of all transformed into the wave reference frame x'y' by a rotation through θ, and then the excitation controls are determined in the wave reference frame by servo controls in the form of electrical voltages Ux' and Uy':

$$Ux'=iCa+Cr$$

$$Uy'=iCp+Cq$$

The trim controls are also determined by dedicated servo controls.

The controls are subsequently switched back into the reference frame xy by an inverse rotation and are then applied (to within a gain factor) to the various transducers.

The excitation chain corresponds to the electronics and to the actuators making it possible to apply the forces calculated by the servo controls to the excitation transducers. It takes, as input, forces FXe and FYe estimated by the servo controls and provides, as output, the forces FX and FY actually applied to the resonator. An excitation matrix E representative of the effect of the excitation chain is defined (see also FIG. 5):

$$\begin{bmatrix}FX\\FY\end{bmatrix}=E\begin{bmatrix}FXe\\FYe\end{bmatrix}=\begin{bmatrix}E11 & E12\\E21 & E22\end{bmatrix}\begin{bmatrix}FXe\\FYe\end{bmatrix} \quad (3)$$

in which E is the excitation matrix.

There are in fact two types of problems: (1) the fact that a force applied along x appears along the axis y, and vice versa: this concerns non-diagonal terms E12 and E21. (2) the fact that the forces applied along x and y do not have the same gains: this is to do with the fact that E11 is generally different than E22.

A perfect excitation matrix E has the following form:

$$\begin{bmatrix}E11 & 0\\0 & E11\end{bmatrix}$$

in which E11 is an actual gain.

The detection chain corresponds to the electronics and to the sensors making it possible to detect the displacements X and Y of the vibration wave. It takes, as input, the actual displacements X and Y and provides, as output, the estimated displacements Xe and Ye. A detection matrix D representative of the effect of the detection chain is defined (see also FIG. 5):

$$\begin{bmatrix}Xe\\Ye\end{bmatrix}=D\begin{bmatrix}X\\Y\end{bmatrix}=\begin{bmatrix}D11 & D12\\D21 & D22\end{bmatrix}\begin{bmatrix}X\\Y\end{bmatrix} \quad (4)$$

in which D is the detection matrix.

A perfect detection matrix D has the following form:

$$\begin{bmatrix}D11 & 0\\0 & D11\end{bmatrix}$$

in which D11 is an actual gain.

FIG. 6 illustrates the effect of the excitation and detection chains using dashed lines and solid lines, respectively. In terms of the excitation, the values of the forces FXe and FYe to be applied are calculated by the servo controls Ass of the processing unit. Due to the excitation chain, the values actually applied to the resonator are FX and FY. Equally, the true values of displacement X and Y undergo a transformation by means of the detection chain, and it is Xe and Ye which are injected at the input of the servo controls Ass. The errors in detection and excitation produce drift errors, and notably mean drift errors that cannot be compensated by electrical rotation means.

In order to correct these errors, that is to say undertake a calibration of the sensor, a solution is to determine the inverses inv(E) and inv(D) (or $E^{-1}$ and $D^{-1}$) of these matrices E and D, in order to be able to apply the corresponding inverse matrix to each chain. For a perfect correction, the correct values to be applied to the resonator and the correct detected values are obtained, as illustrated in FIG. 7. A perfectly corrected operation of the sensor is illustrated in FIG. 8. inv(E) is applied at the output of the servo control Ass and inv(D) is applied to the measurements at the output of detection, prior to the injection thereof into the servo control. There is then for a perfect correction FXe=FX and FYe=FY and Xe=X and Ye=Y.

Document U.S. Pat. No. 9,927,256 describes a calibration method making it possible to determine the correction of at least one excitation control applied to a gyrometer: a amplitude (control Ca), φ phase (control Cr), θ angle (control Cp), b quadrature (control Cq).

The method consists in sending a sinusoidal force at a frequency close to the resonant frequency of the vibration sensor of the sensor, which disturbs the gyrometer, and in utilizing the outputs detected in order to extract therefrom the excitation and detection errors by assuming that, in a forced regime, the detection signals have sinusoidal components identical to those of the disturbances. The detection signals are utilized to extract the matrices A and B by using the fact that the signals detected have a frequency signature identical to the disturbance inserted because the system is linear. These matrices A and B are then inserted into the servo control and the method is iterated up to a predefined criterion. However, beyond the general principle, the method for determining the coefficients of the matrices A and B is not described, and their role in correction is not explained. The spirit of this method is to send particular excitation controls and to observe what happens in the detection signals. The sending of forces on the excitation controls causes the form of the wave to vary. Not all the coefficients of the matrices A and B are observable (determinable) by the set of observations provided by the excitation controls because the observations made in the detection signals exhibit many redundancies with respect to one another, rendering certain coefficients of A and B unobservable even though the number of equations seems to be sufficient vis-à-vis the number of unknowns in the system.

SUMMARY OF THE INVENTION

An aim of the present invention is to remedy the drawbacks mentioned above by proposing an alternative calibration method allowing simultaneous determination of the inverse detection matrix and the inverse excitation matrix by a direct matrix calculation in which all the terms of the matrices are observable.

DESCRIPTION OF THE INVENTION

A subject of the present invention is a method for calibrating an inertial angular sensor, the inertial sensor comprising:

a resonator having a planar structure which is axisymmetric about two perpendicular axes x and y that between them define a sensor reference frame xy and comprising two vibrating mobile masses that are disposed one around the other and that are configured to vibrate in phase opposition at a vibration frequency (w) and along a direction x' defining a wave reference frame x'y', the vibration wave along x' forming an electrical angle with respect to the axis x, the resonator further comprising a plurality of electrostatic transducers controlled by electrical voltages and operating along at least one of the two axes x or y on at least one of the two masses, a pair of detection transducers configured to detect the movements of the vibration wave along x and y and a pair of excitation transducers to which excitation forces are respectively applied along x and y, via a plurality of excitation controls determined by servo controls on the basis of the detected movements, and for keeping the vibration wave in a desired form and vibrating along x', and a pair of transducers for compensating for a quadrature bias, which are controlled via a quadrature control CTxy, and a pair of frequency adjustment transducers, which are respectively controlled via a frequency control CTx along x and a frequency control CTy along y, the three controls CTx, CTy and CTxy being termed trim controls CTi indexed i with i=1, 2, 3, the method being applied when the sensor is operating according to a gyrometer mode, and comprising the steps of:

A for at least two electrical angles of the vibration wave:

A1 sequentially applying, via each of the three trim controls CTi, a sinusoidal stiffness disturbance PSi having a disturbance frequency fi, and for each applied disturbance:

A11 determining and storing an estimated excitation force Fei to be applied to the resonator in the presence of said disturbance PSi, on the basis of the excitation controls determined by the servo controls, B determining, on the basis of said three estimated excitation forces Fei i=1, 2, 3 stored in step A11, as a function of said electrical angles and the applied disturbances, three 2×2 matrices M'i, a matrix M'i being representative of the response of the gyrometer to the disturbance PSi, C determining and storing an estimated inverse excitation matrix $\widehat{inv(E)}$ and an estimated inverse detection matrix $\widehat{inv(E)}$ on the basis of the three matrices M'i determined in step B, an excitation matrix E and a detection matrix D being respectively representative of the effects of the excitation chain and of the effect of the detection chain of the sensor.

According to one embodiment, each estimated excitation force Fei is decomposed into an estimated standard excitation force Fec corresponding to a standard servo control of the sensor and an estimated disturbance compensation excitation force Fepi, and wherein step B comprises the substeps of:

B1 demodulating each estimated excitation force Fei with the vibration frequency and then with the associated disturbance frequency fi to obtain an amplitude of said disturbance compensation excitation force Fepi, B2 determining the matrix M'i on the basis of the amplitude of said force Fepi.

According to one embodiment, step A is carried out with a plurality of electrical angles, said matrices M'i then being determined in step B by statistical filtering minimizing the contribution of the noise of the sensor.

According to one embodiment, each representative matrix M'i determined in step B is of the form:

$$M'i = \widehat{inv(E)} \cdot Mi \cdot \widehat{inv(E)}$$

$Mi$ defined by: $M1 = \begin{bmatrix} 1 & 0 \\ 0 & 0 \end{bmatrix}$; $M2 = \begin{bmatrix} 0 & 0 \\ 0 & 1 \end{bmatrix}$; and $M3 = \begin{bmatrix} 0 & 1 \\ 1 & 0 \end{bmatrix}$ According to one embodiment, the matrices $\widehat{inv(E)}$ and $\widehat{inv(E)}$ are considered close to unitary matrices and are expressed:

$$\widehat{inv(E)} = 1+A$$

$$\widehat{inv(E)} = 1+B$$

the three representative matrices M'i determined in step B then being expressed, disregarding the second-order terms:

$$M'i = AMi + MiB$$

and wherein step C comprises a sub-step of determining said matrices A and B on the basis of said matrices M'i.

Preferably, the disturbance frequencies fi i=1, 2, 3 are between 1000 times less and 100 000 times less than the vibration frequency of the wave.

Preferably, the frequencies fi are lower than 10 Hz.

According to one embodiment, each disturbance PSi has an identical amplitude for all of the electrical angles.

According to one embodiment, each estimated excitation force Fei is decomposed into an estimated standard excitation force Fec corresponding to a standard servo control of the sensor and an estimated disturbance compensation excitation force Fepi, and wherein an amplitude of the disturbance is selected such that an amplitude of the force Fepi is at least 10 times higher than an amplitude of the force Fec.

The invention also relates to a method for measuring an angular velocity of a carrier on which said inertial sensor is disposed, comprising:

a phase of calibrating said inertial sensor implementing the calibration method as claimed in one of claims 1 to 9, said calibration phase being effected when the inertial sensor is started up, a step D of operating said inertial sensor, wherein said stored matrices $\widehat{inv(E)}$ and $\widehat{inv(E)}$ are applied, said estimated inverse excitation matrix $\widehat{inv(E)}$ being applied to the excitation forces determined by said servo controls, prior to the sending on the excitation transducers, so as to pre-compensate for said excitation forces, and said estimated inverse detection matrix $\widehat{inv(E)}$ being applied to the detected movement values so as to correct said detected movement values.

According to one variant, the method for measuring an angular velocity of a carrier on which said inertial sensor is disposed comprises:

a phase of calibrating said inertial sensor implementing the calibration method as claimed in one of claims 1 to 9, said calibration phase being effected when the sensor is operating, the measurement of the angular velocity then being interrupted, a step D' of measuring the angular velocity, carried out during the calibration phase, effected by an additional inertial sensor that is also disposed on the carrier, a step D of operating said inertial sensor, wherein said stored matrices $\widehat{inv(E)}$ and $\widehat{inv(E)}$ are applied, said estimated inverse excitation matrix $\widehat{inv(E)}$ being applied to the excitation forces determined by said servo controls, prior to the sending on the excitation transducers, so as to pre-compensate for said excitation forces, and said estimated inverse detection matrix $\widehat{inv(E)}$ being applied to the detected movement values so as to correct said detected movement values.

The invention also relates to an inertial angular sensor comprising:

a resonator having a planar structure which is axisymmetric about two perpendicular axes x and y that between them define a sensor reference frame xy and comprising two vibrating mobile masses that are disposed one around the other and that are configured to vibrate in phase opposition at a vibration frequency and along a direction x' defining a wave reference frame x'y', the vibration wave (OV) along x' forming an electrical angle (θ) with respect to the axis x, the resonator further comprising a plurality of electrostatic transducers controlled by electrical voltages and operating along at least one of the two axes x or y on at least one of the two masses, a pair of excitation transducers to which excitation forces are respectively applied along x and y, via a plurality of excitation controls, to keep the vibration wave in a desired form and vibrating along x', and a pair of detection transducers configured to detect the movements of the vibration wave along x and y, a pair of transducers for compensating for a quadrature bias, which are controlled via a quadrature control CTxy, and a pair of frequency adjustment transducers, which are respectively controlled via a frequency control CTx along x and a frequency control CTy along y, the three controls CTx, CTy and CTxy being termed indexed trim controls CTi with i=1, 2, 3, said excitation controls being determined by servo controls on the basis of the detected movements, the sensor operating according to a gyrometer mode, the three trim controls CTi being configured to sequentially apply a sinusoidal stiffness disturbance PSi having a disturbance frequency fi, for at least two electrical angles (θj) of the vibration wave, a processing unit configured to:

determine and store, for each applied disturbance, an estimated excitation force Fei to be applied to the resonator in the presence of said disturbance PSi, on the basis of the excitation controls determined by the servo controls, determine, on the basis of said three estimated excitation forces Fei i=1, 2, 3 stored in the preceding step, as a function of said electrical angles and the applied disturbances, three 2×2 matrices M'i, a matrix M'i being representative of the response of the gyrometer to the disturbance PSi, determine and store an estimated inverse excitation matrix $\widehat{inv(E)}$ and an estimated inverse detection matrix $\widehat{inv(E)}$ on the basis of the three matrices M'i determined in the preceding step, an excitation matrix E and a detection matrix D being respectively representative of the effects of the excitation chain and of the effect of the detection chain of the sensor, said estimated inverse excitation matrix $\widehat{inv(E)}$ being intended to be applied to the excitation forces determined by said servo controls, prior to the sending on the excitation transducers, so as to pre-compensate for said excitation forces, and said estimated inverse detection matrix $\widehat{inv(E)}$ being intended to be applied to the detected movement values so as to correct said detected movement values, when the sensor is in operation.

The following description presents a number of examples of embodiment of the device of the invention: these examples do not limit the scope of the invention. These examples of embodiment contain not just the essential features of the invention but also additional features related to the embodiments in question.

BRIEF DESCRIPTION OF THE DRAWINGS

The invention will be better understood and other features, aims and advantages thereof will become apparent from the detailed description that follows and that is given with reference to the appended drawings, which are given by way of non-limiting examples and in which.

DETAILED DESCRIPTION

The calibration method according to the invention applies to an inertial angular sensor comprising a resonator Res and transducers Et, Dt, TF and TQ controlled by excitation controls (Et) and trim controls (TF, TQ) as described above. The vibration wave OV vibrates at a vibration frequency ω. The method according to the invention applies with an inertial sensor operating in gyrometer mode, the servo controls of the excitation controls being in operation.

An aim of the invention is a calibration method allowing determination of an estimated inverse excitation matrix $\widehat{inv(E)}$ and an estimated inverse detection matrix $\widehat{inv(E)}$, in order to improve the operation of the sensor by minimizing the excitation and detection errors.

To that end, disturbances are sent not on the excitation controls as in document U.S. Pat. No. 9,927,256 but via the trim controls. In the conventional operation of a gyroscope comprising these additional transducers (which is not discussed in the cited document above), these controls have a totally different role than that of the excitation controls, as explained above.

The trim controls CTx, CTy and CTxy are hereinafter respectively termed CTi, i=1, 2, 3, that is to say CT1 for CTx, CT2 for CTY and CT3 for CTxy.

This involves, by sending sinusoidal disturbances via these trim controls CTi, direct modification of the coefficients of the differential equation (2) by insertion of a new stiffness matrix Ktp and not modification of the right-hand side thereof (that is to say the applied excitation forces as described in the cited document). It should be noted that the resonator is modified with the trimming combs, whereas the displacement thereof is constrained with the excitation controls.

Figure 1:
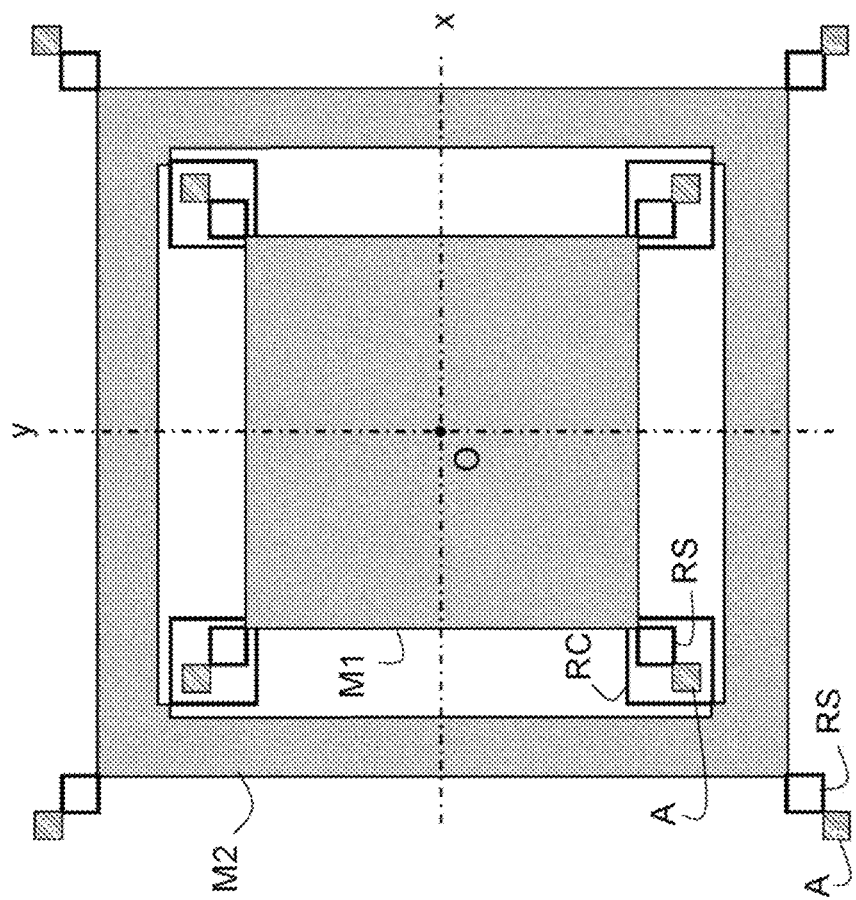
FIG. 1, already mentioned, illustrates a MEMS sensor consisting of two vibrating mobile masses that are disposed one around the other.
Figure 1:
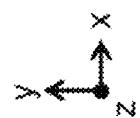
Figure 2:
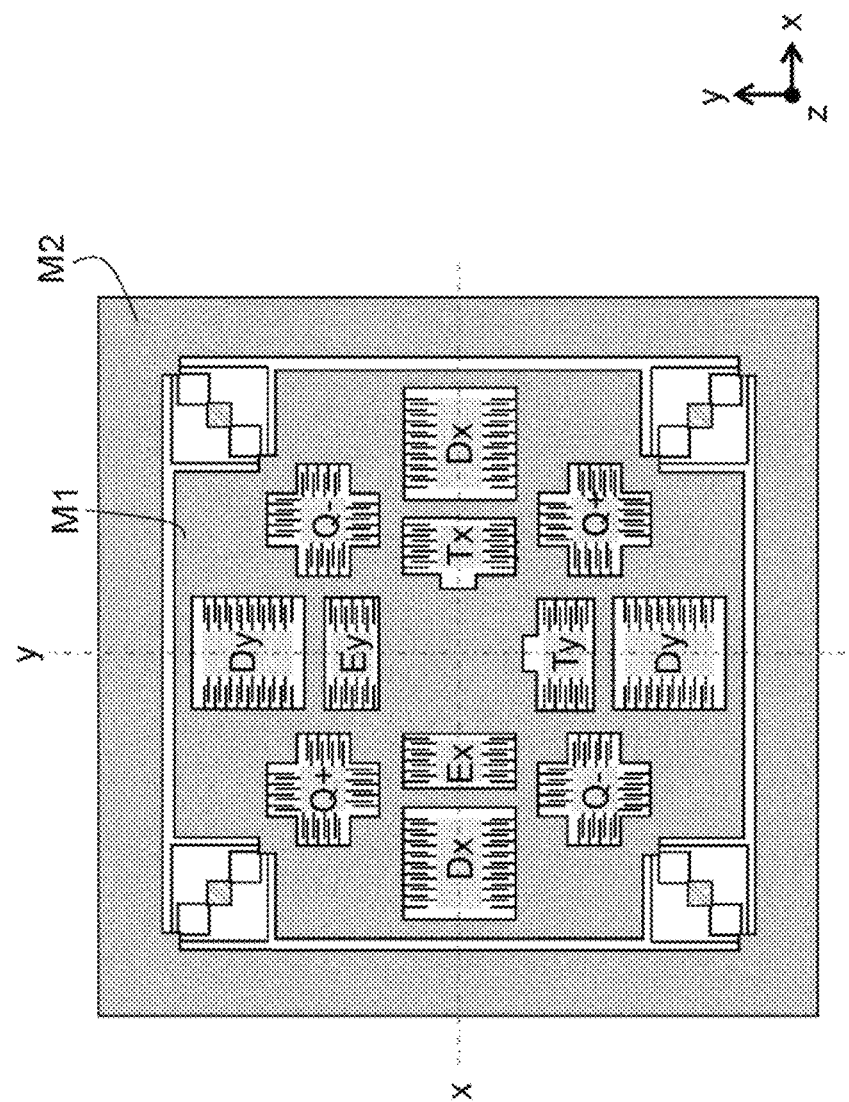
FIG. 2, already mentioned, illustrates the structure of a MEMS sensor with a resonator that is axisymmetric about two axes x and y defining a sensor reference frame.
Figure 3:
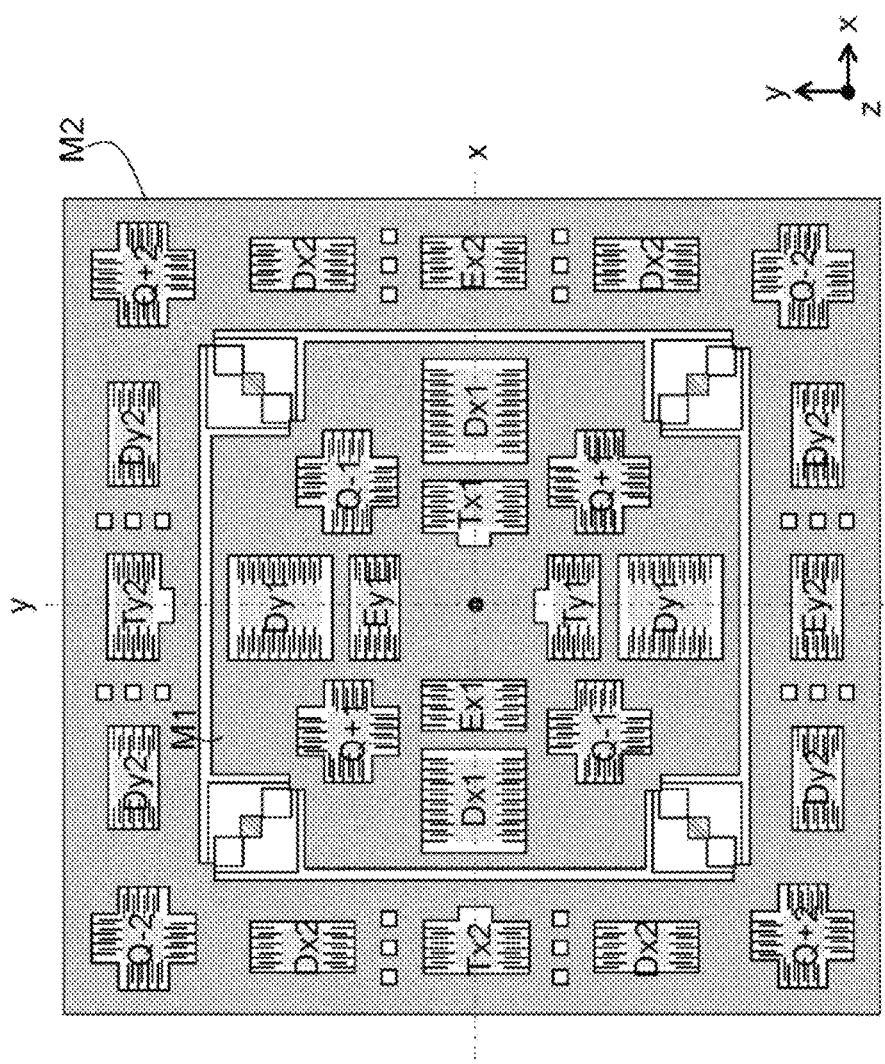
FIG. 3, already mentioned, illustrates a MEMS sensor with transducers on the two masses.
Figure 4:
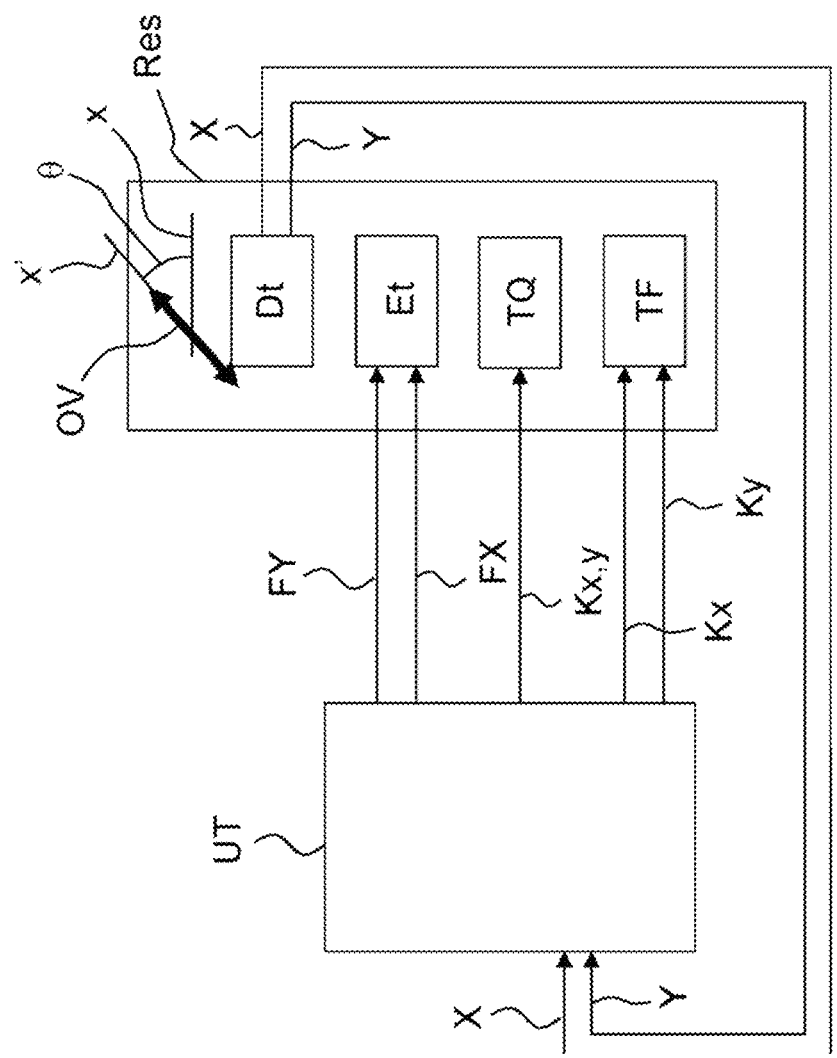
FIG. 4, already mentioned, illustrates the operation of an inertial sensor according to the prior art.
Figure 5:
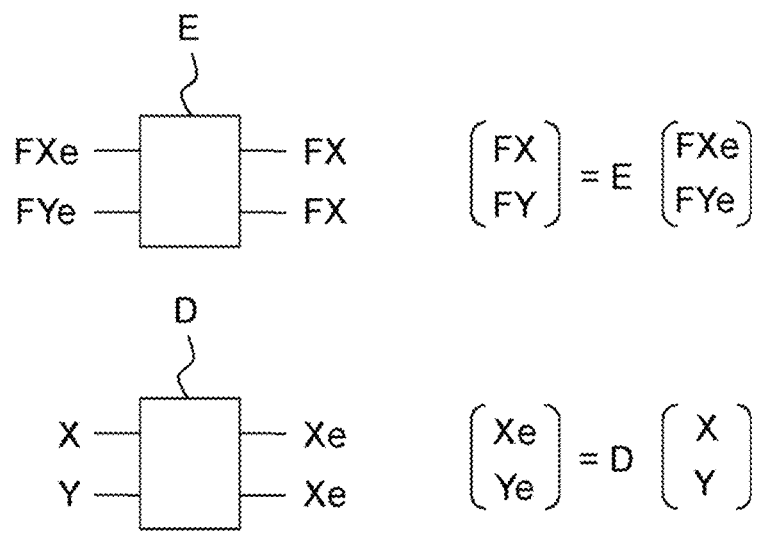
FIG. 5, already mentioned, illustrates the effect of the excitation matrix on the values estimated by the servo controls, and the effect of the detection matrix on the movements of the vibratory wave.
Figure 6:
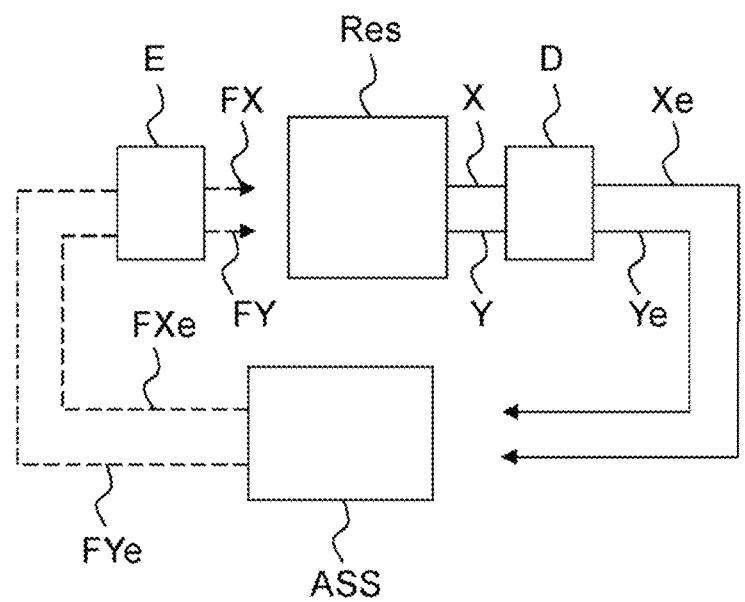
FIG. 6, already mentioned, illustrates the effect of the excitation and detection chains using dashed lines and solid lines, respectively.
Figure 7:
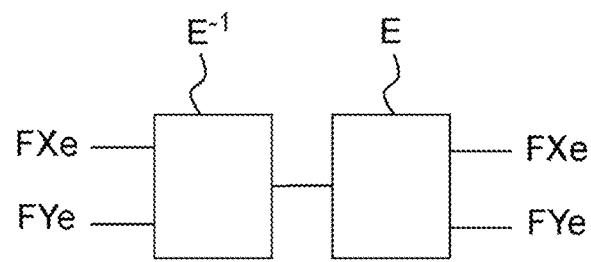
FIG. 7, already mentioned, illustrates a perfect correction in excitation and in detection.
Figure 7:
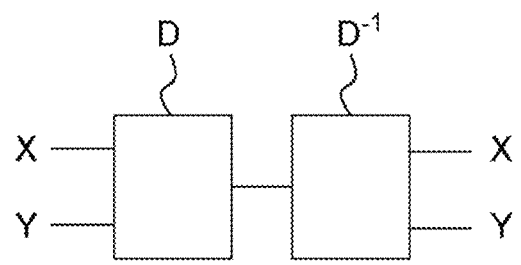
Figure 8:
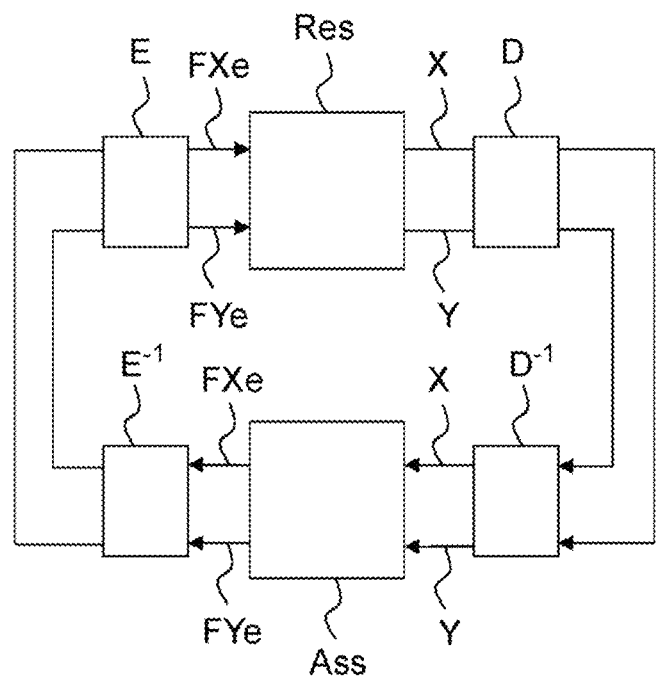
FIG. 8, already mentioned, illustrates a perfectly corrected operation of the sensor.
Figure 9:
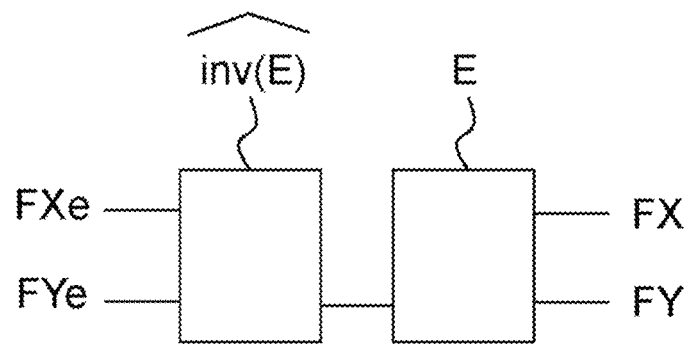
FIG. 9 illustrates the application of an estimated, and therefore non-perfect, inverse excitation matrix $\widehat{inv(E)}$ as determined by the method according to the invention.
Figure 10:
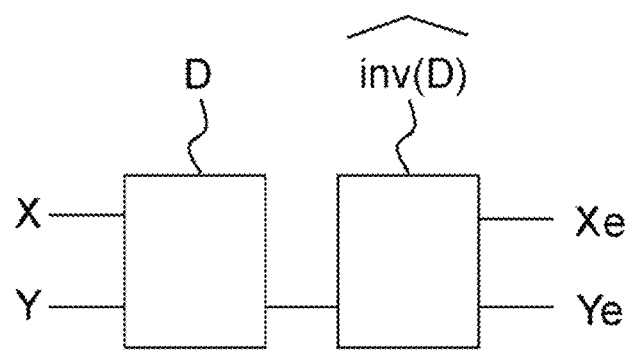
FIG. 10 illustrates the application of an estimated, and therefore non-perfect, inverse detection matrix $\widehat{inv(E)}$ as determined by the method according to the invention.

The estimated matrices $\widehat{inv(E)}$ and $\widehat{inv(E)}$ determined by the method according to the invention are not perfect, as illustrated in FIG. 9 for the excitation and in FIG. 10 for the detection, that is to say that they are not strictly equal respectively to the inverse of the matrix E and to the inverse of the matrix D: the products D. $\widehat{inv(E)}$ and $\widehat{inv(E)}$. E are not equal to the identity matrix, while drawing closer thereto.

Figure 11:
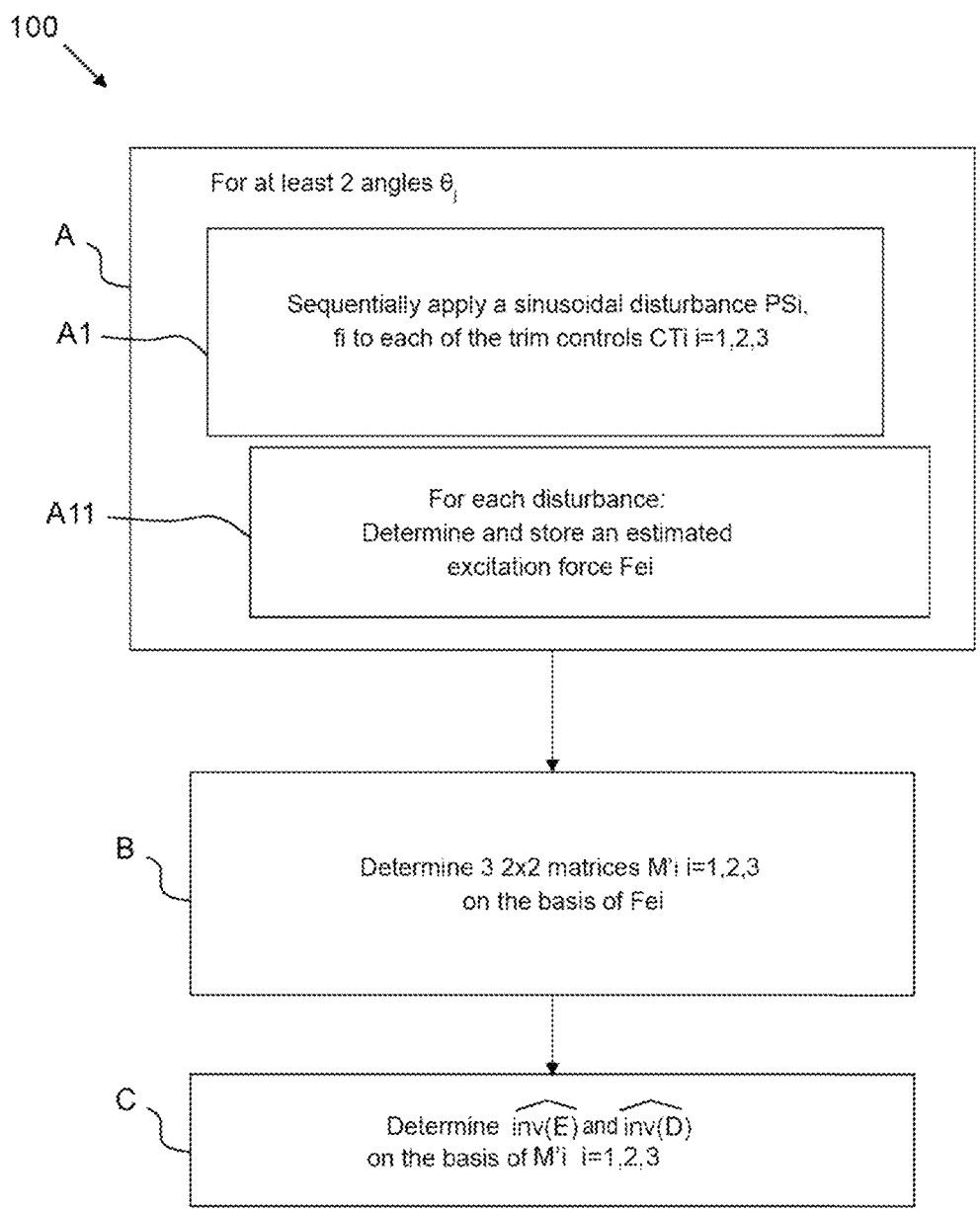
FIG. 11 illustrates the method for calibrating a sensor according to the invention.

The method 100 according to the invention, as illustrated in FIG. 11, comprises a first step A of, for at least two electrical angles θj of the vibration wave, carrying out a sub-step A1 of sequentially applying, via each of the three trim controls CTi, a sinusoidal stiffness disturbance PSi of disturbance frequency fi.

To this end, a sinusoidal electrical voltage of frequency fi is applied to the control CTi.

For each applied disturbance PSi, an estimated excitation force Fei, to be applied to the resonator in the presence of said disturbance PSi in order to maintain the linear vibration, is determined and stored during sub-step A11 on the basis of the excitation controls determined by the servo controls. The characteristics of the resonator are changed by rendering them sinusoidal and the forces that have to be applied to have a linear wave are observed.

A sinusoidal stiffness disturbance PS1 applied via the control CT1 produces a variation in sinusoidal stiffness of Kx corresponding to a stiffness matrix Ktp1:

$$Ktp1 = \begin{bmatrix} A1\cos(2\pi f1t) & 0 \\ 0 & 0 \end{bmatrix}$$

A sinusoidal stiffness disturbance PS2 applied via the control CT2 produces a variation in sinusoidal stiffness of Ky corresponding to a stiffness matrix Ktp2:

$$Ktp2 = \begin{bmatrix} 0 & 0 \\ 0 & A2\cos(2\pi f2t) \end{bmatrix}$$

A sinusoidal stiffness disturbance PS3 applied via the control CT3 produces a variation in sinusoidal stiffness of Kxy corresponding to a stiffness matrix Ktp3:

$$Ktp3 = \begin{bmatrix} 0 & A3\cos(2\pi f3t) \\ A3\cos(2\pi f3t) & 0 \end{bmatrix}$$

Then, during a step B, three 2×2 matrices M'i that are representative of the response of the gyrometer to the disturbance PSi are determined, on the basis of the three estimated excitation forces Fei i=1, 2, 3 stored in step A11, as a function of the electrical angles θj and the applied disturbances PSi. A preferred mode of calculation of the matrices M'i is described further below.

Lastly, in a step C, an estimated inverse excitation matrix $\widehat{inv(E)}$ and an estimated inverse detection matrix $\widehat{inv(E)}$ are determined and stored on the basis of the three matrices M'i determined in step B, an excitation matrix E and a detection matrix D being respectively representative of the effect of the excitation chain and of the effect of the detection chain of the sensor.

Once these estimated matrices have been determined and stored, they are intended to be implemented during the operation of the sensor, that is to say when said sensor performs a measurement: $\widehat{inv(E)}$ is intended to be applied to the excitation forces determined by the servo controls, prior to the sending on the excitation transducers, so as to pre-compensate for these excitation forces; $\widehat{inv(E)}$ is intended to be applied to the detected movement values so as to correct these values. The excitation and detection errors of the measurement are thus minimized by applying the estimated inverse matrices.

In other words, the method according to the invention has the benefit of "easily" determining detection and excitation faults by a calculation, utilizing a supplementary actuator, that of trimming included in certain MEMS gyrometers, which provides supplementary observability.

In practice, according to one embodiment, the method according to the invention is iterative, thus allowing the precision thereof to be improved. Typically, there are no more than two iterations.

When a disruptive matrix Ktpi as described above is applied to a transducer TQ or TF, equation (2) becomes, for a first variant in which only the disturbances PSi and not the conventional trim controls are applied (the trim servo controls are non-operational in this case):

$$M\begin{bmatrix}\ddot{X}\\\ddot{Y}\end{bmatrix}+A\begin{bmatrix}\dot{X}\\\dot{Y}\end{bmatrix}+K\begin{bmatrix}X\\Y\end{bmatrix}+C\begin{bmatrix}\dot{X}\\\dot{Y}\end{bmatrix}-Ktpi\begin{bmatrix}X\\Y\end{bmatrix}=\begin{bmatrix}FXc\\FYc\end{bmatrix}+\begin{bmatrix}FXpi\\FYpi\end{bmatrix} \quad (5)$$

For the sake of simplicity, Fi being expressed as two components (FX, FY) is termed the applied excitation force. Fi is decomposed into a standard excitation force Fc (FXc, FYc) for carrying out the current servo control of the sensor in the absence of disturbance, and a compensation excitation force Fpi (FXpi, FYpi) for compensating for the application of the disturbance PSi:

It may be seen that the application of a disturbance induces a modification of certain coefficients in the differential equation (5) with respect to the conventional equation (2):

$$Fi = Fc + Fpi; FXi = FXc + FXpi; FYi = FYc + FYpi$$

$$\begin{bmatrix}FXi\\FYi\end{bmatrix}=\begin{bmatrix}FXc\\FYc\end{bmatrix}+\begin{bmatrix}FXpi\\FYpi\end{bmatrix}$$

The amplitude of the applied disturbances PSi is selected such that the amplitudes of (FXpi, FYpi) are at least 10 times higher than the amplitudes of (FXc, FYc). This selection is made such that the phenomena to be observed readily emerge from the noise and are more easily observable. However, the amplitude cannot be increased excessively either, since the controls practically do not allow this to happen.

The force Fc controls the resonator in a conventional manner such that the wave is for example linear and of a given amplitude, and there results (in a manner similar to equation (1)):

$$M\begin{bmatrix}\ddot{X}\\\ddot{Y}\end{bmatrix}+A\begin{bmatrix}\dot{X}\\\dot{Y}\end{bmatrix}+K\begin{bmatrix}X\\Y\end{bmatrix}+C\begin{bmatrix}\dot{X}\\\dot{Y}\end{bmatrix}=\begin{bmatrix}FXc\\FYc\end{bmatrix} \quad (6)$$

Due to the frequency difference between Fc and Fp and due to the linearity of the system, it is possible to isolate:

$$-Ktpi\begin{bmatrix}X\\Y\end{bmatrix}=\begin{bmatrix}FXpi\\FYpi\end{bmatrix} \quad (7)$$

According to a second variant, the disturbances PSi are applied in superposition with the conventional trim controls (matrix Kt) (the trim servo controls are then in operation). Equation (2) then becomes:

$$M\begin{bmatrix}\ddot{X}\\\ddot{Y}\end{bmatrix}+A\begin{bmatrix}\dot{X}\\\dot{Y}\end{bmatrix}+K\begin{bmatrix}X\\Y\end{bmatrix}+ \\ C\begin{bmatrix}\dot{X}\\\dot{Y}\end{bmatrix}-Kt\begin{bmatrix}X\\Y\end{bmatrix}-Ktpi\begin{bmatrix}X\\Y\end{bmatrix}=\begin{bmatrix}FXc\\FYc\end{bmatrix}+\begin{bmatrix}FXpi\\FYpi\end{bmatrix} \quad (5')$$

Equally, the conventional servo control of the resonator is expressed:

$$M\begin{bmatrix}\ddot{X}\\\ddot{Y}\end{bmatrix}+A\begin{bmatrix}\dot{X}\\\dot{Y}\end{bmatrix}+K\begin{bmatrix}X\\Y\end{bmatrix}+C\begin{bmatrix}\dot{X}\\\dot{Y}\end{bmatrix}-Kt\begin{bmatrix}X\\Y\end{bmatrix}=\begin{bmatrix}FXc\\FYc\end{bmatrix} \quad (6')$$

and formula (7) is still shown to be true.

On the basis of formula (7), and of (3) and (4), the excitation matrix E and detection matrix D are introduced (which are also termed excitation error matrix and detection error matrix):

$$inv(D)\begin{bmatrix}\ddot{X}e\\\ddot{Y}e\end{bmatrix}+Ainv(D)\begin{bmatrix}\dot{X}e\\\dot{Y}e\end{bmatrix}+Kinv(D)\begin{bmatrix}Xe\\Ye\end{bmatrix}+ \\ Cinv(D)\begin{bmatrix}\dot{X}e\\\dot{Y}e\end{bmatrix}-Ktpi.inv(D)\begin{bmatrix}Xe\\Ye\end{bmatrix}=E\begin{bmatrix}FXec\\FYec\end{bmatrix}+E\begin{bmatrix}FXepi\\FYepi\end{bmatrix} \quad (8)$$

with Fe (FXe, FYe) the estimated force for controlling the oscillator, which is decomposed into a force Fec (FXec, FYec) and a force Fepi (FXepi, FYepi) according to the same logic as above:

Fec the estimated standard excitation force for carrying out the conventional servo control of the sensor in the absence of disturbance, Fepi the estimated compensation excitation force for compensating for the application of the disturbance.

$$\begin{bmatrix}FXei\\FYei\end{bmatrix}=\begin{bmatrix}FXec\\FYec\end{bmatrix}+\begin{bmatrix}FXepi\\FYepi\end{bmatrix}$$

That is to say FXei=FXec+FXepi and FYei=FYec+FYepi
The forces actually applied have the values:

$$\begin{bmatrix}FXi\\FYi\end{bmatrix}=\begin{bmatrix}FXc\\FYc\end{bmatrix}+\begin{bmatrix}FXpi\\FYpi\end{bmatrix}=E\begin{bmatrix}FXei\\FYei\end{bmatrix}=E\left(\begin{bmatrix}FXec\\FYec\end{bmatrix}+\begin{bmatrix}FXepi\\FYepi\end{bmatrix}\right)$$

On the basis of Fei $$\begin{bmatrix}FXei\\FYei\end{bmatrix},$$

the amplitudes of $$\begin{bmatrix}FXepi\\FYepi\end{bmatrix}$$

will be extracted.

FXec and FYec are sinusoidal functions of frequency $\omega$.

FXepi and FYepi are sinusoidal functions of $\omega$ that are modulated by the disturbances introduced in Ktpi, that is to say at the frequency fi.

Theoretically, there results:

$$-Ktpi.\,inv(D)\begin{bmatrix}Xe\\Ye\end{bmatrix}=E\begin{bmatrix}FXepi\\FYepi\end{bmatrix}\text{ because }E\begin{bmatrix}FXepi\\FYepi\end{bmatrix}$$

is the force which counters the disturbance by definition.

For each trimming comb and therefore each applied disturbance PSi, and for a vibration angle $\theta$ of the wave, there theoretically results:

$$inv(E)\begin{bmatrix}A1\cos(2\pi f1t)&0\\0&0\end{bmatrix}inv(D)\begin{bmatrix}X0\cos(\theta)\cos(\omega t)\\X0\sin(\theta)\cos(\omega t)\end{bmatrix}=\begin{bmatrix}FXep1(\theta)\\FYep1(\theta)\end{bmatrix}\quad(9)$$

$$inv(E)\begin{bmatrix}0&0\\0&A2\cos(2\pi f1t)\end{bmatrix}inv(D)\begin{bmatrix}X0\cos(\theta)\cos(\omega t)\\X0\sin(\theta)\cos(\omega t)\end{bmatrix}=\begin{bmatrix}FXep2(\theta)\\FYep2(\theta)\end{bmatrix}\quad(10)$$

$$inv(E)\begin{bmatrix}0&A3\cos(2\pi f1t)\\A3\cos(2\pi f1t)&0\end{bmatrix}\quad(11)$$

$$inv(D)\begin{bmatrix}X0\cos(\theta)\cos(\omega t)\\X0\sin(\theta)\cos(\omega t)\end{bmatrix}=\begin{bmatrix}FXep3(\theta)\\FYep3(\theta)\end{bmatrix}$$

in which:

X0 is the known amplitude of the vibration controlled by servo control $\omega$ is the known angular frequency of the resonator Ai are the known amplitudes of the disturbances PSi fi are the known frequencies of the disturbances PSi $\theta$ is the known angle to which the gyrometer is controlled The calculations are performed for i=1, and the reasoning is the same for i=2 and 3.

The amplitudes of the terms on the right and left of equation (9) are the same, therefore there theoretically results:

$$A1.\,inv(E)\begin{bmatrix}1&0\\0&0\end{bmatrix}inv(D)\begin{bmatrix}X0\cos(\theta)\\X0\sin(\theta)\end{bmatrix}=\begin{bmatrix}AFXeP1(\theta)\\AFYep1(\theta)\end{bmatrix}\quad(12)$$

in which $AFXep1(\theta)$ denotes the amplitude of $FXep1(\theta)$.

It is desired to determine $$\begin{bmatrix}AFXep1(\theta)\\AFYep1(\theta)\end{bmatrix}$$

in order to deduce therefrom the matrix M'1 defined by:

$$M'1=inv(E)\begin{bmatrix}1&0\\0&0\end{bmatrix}inv(D)=inv(E).M1.\,inv(D)\quad(13)$$

with $M1=\begin{bmatrix}1&0\\0&0\end{bmatrix}$

Access is given to the forces Fei (FXei, FYei) which were stored in step A11, that is to say in this case:

$$\begin{bmatrix}FXe1(\theta)\\FYe1(\theta)\end{bmatrix}=\begin{bmatrix}FXec(\theta)\\FYec(\theta)\end{bmatrix}+\begin{bmatrix}FXep1(\theta)\\FYep1(\theta)\end{bmatrix}$$

$$\begin{bmatrix}FXec(\theta)\\FYec(\theta)\end{bmatrix}$$

are sinusoids at the angular frequency $\omega$ of the resonator, $$\begin{bmatrix}FXep1(\theta)\\FYep1(\theta)\end{bmatrix}$$

are sinusoids at the angular frequency $\omega$ of the resonator that are modulated by a sinusoidal function at the angular frequency $2\pi f1$.

Demodulation is performed in terms of $\omega$ and then in terms of $2\pi f1$ in order to determine the amplitudes of $$\begin{bmatrix}FXep1(\theta)\\FYep1(\theta)\end{bmatrix},$$

giving $$\begin{bmatrix}AFXep1(\theta)\\AFYep1(\theta)\end{bmatrix}$$

(demodulation is an operation well known to those skilled in the art in various fields).

Thus, according to one embodiment of the invention, step B comprises:

a sub-step B1 of demodulating each estimated excitation force Fei with the vibration frequency $\omega$ and then with the associated disturbance frequency fi, in order to obtain an amplitude AFpei (AFXepi, AFYepi) of the disturbance compensation excitation force Fepi (FXepi, FYepi).

a sub-step B2 of determining the matrix M'i on the basis of the amplitude of the force Fepi determined in B1.

According to one embodiment of the invention, each matrix M'i that is representative of the response of the gyrometer to the disturbance M'i and that is determined in step B is of the form:

$$M'i=\widetilde{inv(E)}.Mi.\widetilde{inv(E)}$$

with Mi i=1, 2, 3 defined by:

$$M1=\begin{bmatrix}1&0\\0&0\end{bmatrix};M2=\begin{bmatrix}0&0\\0&1\end{bmatrix};\text{ and }M3=\begin{bmatrix}0&1\\1&0\end{bmatrix}$$

It will now be explained how M'i is determined on the basis of AFpei.

We start with equation (12):

$$A1.inv(E)\begin{bmatrix}1&0\\0&0\end{bmatrix}inv(D)\begin{bmatrix}X0\cos(\theta)\\X0\sin(\theta)\end{bmatrix}=\begin{bmatrix}AFXep1(\theta)\\AFYep1(\theta)\end{bmatrix}$$

which can be put in the form:

$$M'1.\begin{bmatrix}A1.X0\cos(\theta)\\A1.X0\sin(\theta)\end{bmatrix}=\begin{bmatrix}AFXep1(\theta)\\AFYep1(\theta)\end{bmatrix}\quad(14)$$

A1, X0, $\theta$, $AFXep1(\theta)$ and $AFYep1(\theta)$ are known.

M'1 has 4 unknowns (4 coefficients). There therefore has to be at least two angles to grant four coefficients of M'1.

In actual fact, this procedure is carried out for more than two angles and statistical filtering, typically of the least squares type, is carried out to optimally estimate the coefficients of M'1. Thus, according to one embodiment, step A is carried out with a plurality of electrical angles, the matrices M'i then being determined in step B by statistical filtering (of the least squares type, for example) minimizing the contribution of the noise of the sensor.

Thus, on the basis of equation (14) and the various known quantities, access is given to M'1 estimated from $$\widehat{inv(E)} \begin{bmatrix} 1 & 0 \\ 0 & 0 \end{bmatrix} \widehat{inv(D)},$$

that is to say:

$$M'1 = \widehat{inv(E)} \begin{bmatrix} 1 & 0 \\ 0 & 0 \end{bmatrix} \widehat{inv(D)} \qquad (15)$$

The same procedure is performed for M'2 and M'3.

$$M'2 = \widehat{inv(E)} \begin{bmatrix} 0 & 0 \\ 0 & 1 \end{bmatrix} \widehat{inv(D)} \qquad (16)$$

$$M'3 = \widehat{inv(E)} \begin{bmatrix} 0 & 1 \\ 1 & 0 \end{bmatrix} \widehat{inv(D)} \qquad (17)$$

It will now be shown that it is possible to determine $\widehat{inv(E)}$ and $\widehat{inv(E)}$ on the basis of the matrices M'i determined in step B (using equation (14) and its equivalents for i=2 and 3) by virtue of equations (15) to (17).

It is a non-linear problem, but $\widehat{inv(E)}$ and $\widehat{inv(E)}$ are matrices that are close to the identity because the electronic errors are small.

It is therefore possible to decompose them thus:

$$\widehat{inv(E)} = \begin{bmatrix} 1+e11 & e12 \\ e21 & 1+e22 \end{bmatrix} = I + A \qquad (18)$$

$$\widehat{inv(D)} = \begin{bmatrix} 1+d11 & d12 \\ d21 & 1+d22 \end{bmatrix} = I + B \qquad (19)$$

in which I denotes the identity and eij, dij are small values (typically smaller than 0.01)

Therefore:

$\widehat{inv(E)}.Mi.\widehat{inv(E)} = AMi + MiB$, disregarding the second-order terms.

On the basis of AMi+MiB=known M'i, it will be possible to determine A and B.

With M1:

$$AM1 + \qquad (20)$$
$$M1B = \begin{bmatrix} e11 & e12 \\ e21 & e22 \end{bmatrix} \begin{bmatrix} 1 & 0 \\ 0 & 0 \end{bmatrix} + \begin{bmatrix} 1 & 0 \\ 0 & 0 \end{bmatrix} \begin{bmatrix} d11 & d12 \\ d21 & d22 \end{bmatrix} = \begin{bmatrix} e11+d11 & d12 \\ e21 & 0 \end{bmatrix}$$

d12 and e21, and also e11+d11, are therefore identified.

With M2:

$$AM2 + \qquad (21)$$
$$M2B = \begin{bmatrix} e11 & e12 \\ e21 & e22 \end{bmatrix} \begin{bmatrix} 0 & 0 \\ 0 & 1 \end{bmatrix} + \begin{bmatrix} 0 & 0 \\ 0 & 1 \end{bmatrix} \begin{bmatrix} d11 & d12 \\ d21 & d22 \end{bmatrix} = \begin{bmatrix} 0 & e12 \\ d21 & e22+d22 \end{bmatrix}$$

d21, e12 and e22+d22 are obtained.

With M3:

$$AM3 + M3B = \begin{bmatrix} e11 & e12 \\ e21 & e22 \end{bmatrix} \begin{bmatrix} 0 & 1 \\ 1 & 0 \end{bmatrix} + \begin{bmatrix} 0 & 1 \\ 1 & 0 \end{bmatrix} \begin{bmatrix} d11 & d12 \\ d21 & d22 \end{bmatrix} =$$
$$\begin{bmatrix} e12+d21 & e11+d22 \\ e22+d11 & e21+d12 \end{bmatrix}$$

e22+d11 and e11+d22 are therefore obtained, this allowing in combination with e11+d11 from (20) and e22+d22 from (21).

It should be noted that equations e22+d11, e11+d22, e11+d11 and e22+d22 are not independent, the system is of rank 3: for example (e22+d22)+(e11+d11)−(e11+d22)=e22+d11. It is therefore not possible to determine the 4 coefficients from the 4 equations. But equation (8) can be multiplied on the right and on the left arbitrarily by any value. For example, it is possible to arbitrarily decide to divide everything by (1+d11), such that d11 would be equal to 0 in this new system, thus eliminating this unknown and making it possible to determine the unknowns e22 then d22 then e11.

Thus, according to one embodiment of the method according to the invention, the three representative matrices M'i determined in step B are expressed, disregarding the second-order terms, in the form M'i=AMi+MiB, and step C comprises a sub-step of determining the matrices A and B (8 coefficients) on the basis of said matrices M'i. Thus, using the method as claimed, these 8 coefficients are all observable. The matrices $\widehat{inv(E)}$ and $\widehat{inv(E)}$ are then determined on the basis of A and B (equations (18) and (19)).

By simulating the practical behavior of the gyrometer in fine detail, it is possible to determine simulated coefficients of the matrices E and D. When the quantities $\widehat{inv(E)}.E$ and $D.\widehat{inv(E)}$ are calculated using these simulated coefficients and the values of the coefficients of $\widehat{inv(E)}$ and $\widehat{inv(E)}$ determined by the method according to the invention, the identity matrix with error of between 10 ppm and 200 ppm is obtained, this constituting a very high degree of precision of estimation for $\widehat{inv(E)}.E$ and $D.\widehat{inv(E)}$.

In order for the stiffnesses to change slowly enough in equation (8) to be considered constants, the frequencies f1, f2 and f3 of the disturbances PS1, PS2 and PS3 are preferably selected to be much lower than the vibration frequency ω, typically between 1000 times and 100 000 times less. Since the vibration frequency of the wave is typically of the order of around ten kHz, the frequencies f1, f2 and f3 are typically lower than 10 Hz or even than one Hz.

Furthermore, the frequencies f1, f2 and f3 of the disturbances PS1, PS2 and PS3 are preferably selected to be greater than the frequencies of the physical phenomena responsible for the drifts of the sensor, and more particularly of the physical phenomena linked to the variations in the temperature of the sensor. These phenomena typically have frequencies much lower than one Hz, or even than one tenth of a Hz.

Thus, the frequencies f1, f2 and f3 are preferably greater than 0.1 Hz.

Preferably, the frequencies f1, f2 and f3 are injected separately; these frequencies may therefore be equal. However, for the implementation of the method, this is not important.

Figure 12:
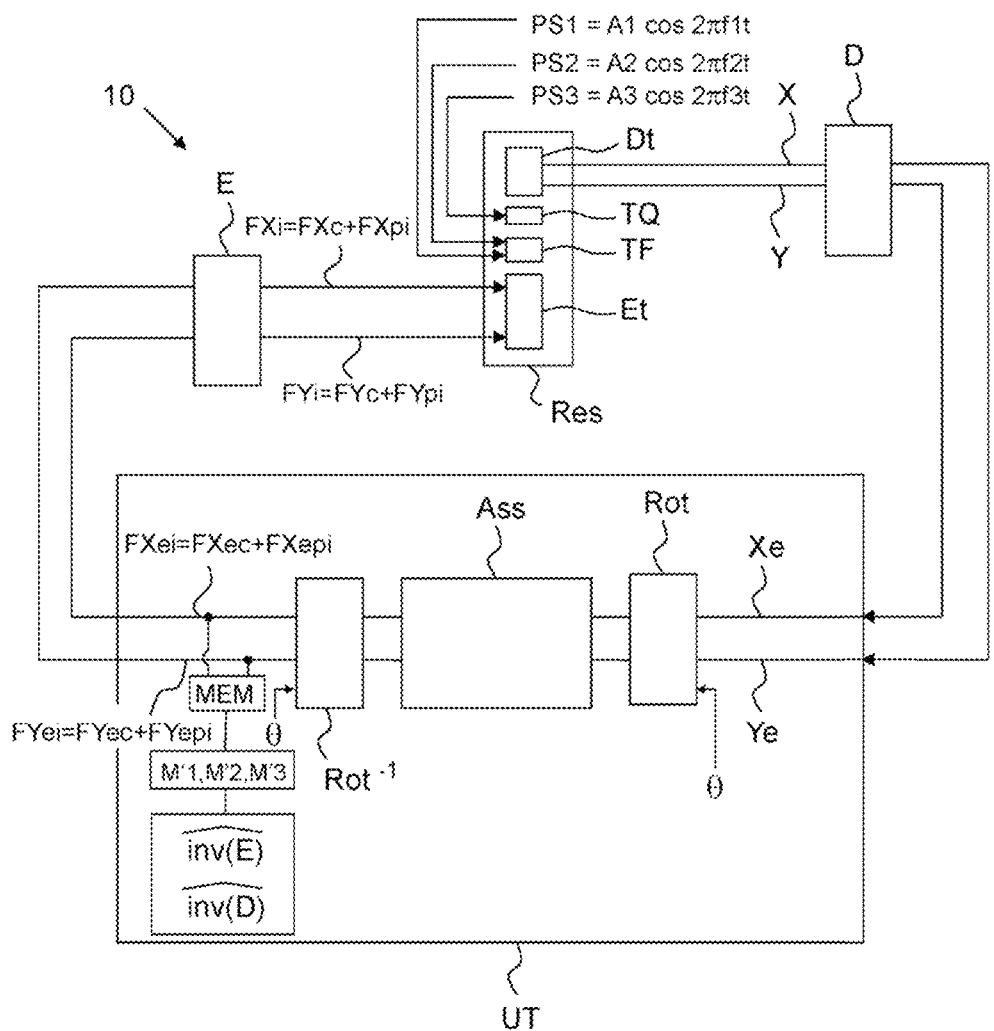
FIG. 12 illustrates the inertial angular sensor 10 implementing the calibration method according to the invention.

FIG. 12 illustrates the inertial angular sensor 10 implementing the calibration method 100 according to the invention. The disturbances PSi are sequentially applied to the transducers TQ or TF. The processing unit UT effects a change in reference frame on the estimated movements (Xe, Ye) of the resultant vibration and then calculates the estimated excitation controls permitting the servo control of the sensor (servo control module Ass) in the presence of the disturbance. Then, after a return to the sensor reference frame, the estimated excitation forces FXei, FYei are determined and stored (MEM). On the basis of these forces, the processing unit determines the coefficients of the matrices $\widehat{inv(E)}$ and $\widehat{inv(E)}$ and stores them.

Figure 13:
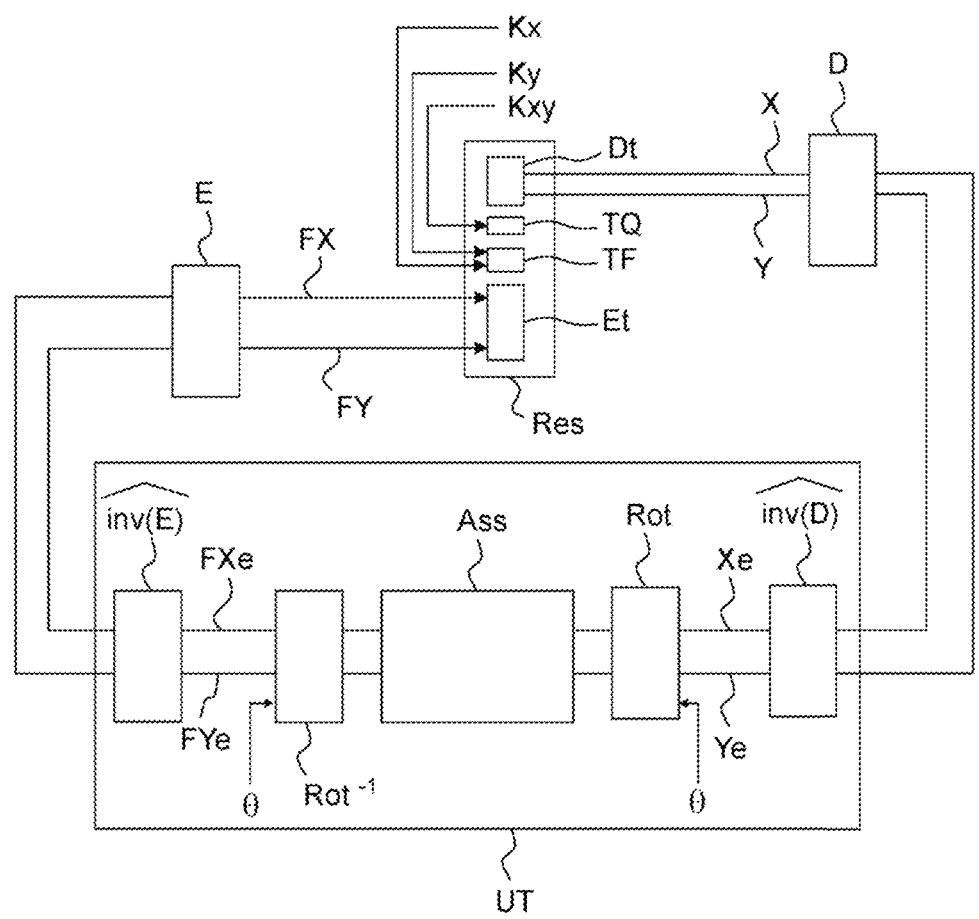
FIG. 13 illustrates a sensor in operation implementing the calibration according to the invention.

FIG. 13 illustrates a sensor in operation, that is to say in the course of performing a measurement of angular velocity, the calibration having ended and the matrices $\widehat{inv(E)}$ and $\widehat{inv(E)}$ stored. The processing unit applies $\widehat{inv(E)}$ to the movements measured by the sensor and $\widehat{inv(E)}$ to the excitation forces estimated by the servo controls. The trimming servo controls (not shown) then operate in a conventional manner.

The calibration method can be implemented according to a number of modes of use.

For all the modes, once the calibration has been effected and when the sensor is in operation, the estimated inverse excitation matrix $\widehat{inv(E)}$ is applied to the excitation forces determined by the servo controls, prior to the sending on the excitation transducers, so as to pre-compensate for said excitation forces, and the estimated inverse detection matrix $\widehat{inv(E)}$ is applied to the detected movement values so as to correct the detected movement values.

In a first mode of use, a phase of calibrating the inertial sensor implementing the method 100 according to the invention is carried out before the sensor is put into operation, typically at the output of the manufacturing chain (factory calibration). The inverse excitation and detection matrices are stored in the processing unit. They are then applied when the sensor is in operation and performing a measurement.

According to a second mode of use, the invention relates to a method for measuring an angular velocity of a carrier on which the inertial sensor 10 is disposed, comprising a calibration phase that implements the calibration method 100 according to the invention and that is effected when the sensor is started up. Once the calibration has ended, a step D involves performing a measurement applying the stored matrices $\widehat{inv(E)}$ and $\widehat{inv(E)}$.

According to a third mode of use, the invention relates to a method for measuring an angular velocity of a carrier on which the inertial sensor 10 is disposed, comprising a calibration phase that implements the calibration method 100 according to the invention and that is effected during operation. In the calibration phase, the inertial sensor cannot perform measurements, and therefore the measurement of the angular velocity by the sensor 10 is interrupted during the calibration phase.

While the sensor 10 is being calibrated, the method implements a step D' of measuring the angular velocity, said step being carried out by an additional inertial sensor that is also disposed on the carrier, and this is done to guarantee continuity of measurement.

Once the calibration has ended, the sensor 10 reasserts control over the measurement by carrying out, in step D, a measurement applying the stored matrices $\widehat{inv(E)}$ and $\widehat{inv(E)}$.

The switching from one sensor to the other is effected, for example, periodically in time, allowing calibration throughout the duration of operation of the sensor 10.

By simulating the practical behavior of the gyrometer in fine detail, it is possible to determine simulated coefficients of the matrices E and D.

When the quantities $\widehat{inv(E)}.E$ and $D.\widehat{inv(E)}$ are calculated using the values of the coefficients of $\widehat{inv(E)}$ and $\widehat{inv(E)}$ determined by the method according to the invention, the identity matrix with error of between 10 ppm and 200 ppm is obtained, which is a very high degree of precision.

The invention claimed is:

1. A method for calibrating an inertial angular sensor, the inertial sensor comprising:
    a resonator (Res) having a planar structure which is axisymmetric about two perpendicular axes x and y that between them define a sensor reference frame xy and comprising two vibrating mobile masses (M1, M2) that are disposed one around the other and that are configured to vibrate in phase opposition at a vibration frequency ($\omega$) and along a direction x' defining a wave reference frame x'y', the vibration wave (OV) along x' forming an electrical angle ($\theta$) with respect to the axis x,
    the resonator further comprising a plurality of electrostatic transducers controlled by electrical voltages and operating along at least one of the two axes x or y on at least one of the two masses,
    a pair of detection transducers (Dt) configured to detect movements of the vibration wave along x and y and a pair of excitation transducers (Et) to which excitation forces are respectively applied along x and y, via a plurality of excitation controls determined by servo controls on the basis of the detected movements, and for keeping the vibration wave in a desired form and vibrating along x', and
    a pair of transducers (TQ) for compensating for a quadrature bias, which are controlled via a quadrature control CTxy, and a pair of frequency adjustment transducers (TF), which are respectively controlled via a frequency control CTx along x and a frequency control CTy along y, the three controls CTx, CTy and CTxy being trim controls CT, wherein CTi is indexed i with i=1, 2, 3,
    the method being applied when the sensor is operating according to a gyrometer mode, and comprising the steps of:
    A for at least two electrical angles ($\theta$j) of the vibration wave:
        A1 sequentially applying, via each of the three trim controls CTi, a sinusoidal stiffness disturbance PSi having a disturbance frequency fi, and for each applied disturbance:
            A11 determining and storing an estimated excitation force Fei with i=1, 2, 3 to be applied to the resonator in the presence of said disturbance PSi, on the basis of the excitation controls determined by the servo controls,
    B determining, on the basis of said three estimated excitation forces Fei with i=1, 2, 3 stored in step A11, as a function of said electrical angles and the applied disturbances, three 2×2 matrices M'i with i=1, 2, 3, each matrix M'i being representative of the response of the gyrometer to the respective disturbance PSi, and C determining and storing an estimated inverse excitation matrix $\widehat{inv(E)}$ and an estimated inverse detection matrix $\widehat{inv(E)}$ on the basis of the three matrices M'i determined in step B, an excitation matrix E and a detection matrix D being respectively representative of effects of an excitation chain and of an effect of a detection chain of the sensor.

2. The method as claimed in claim 1, wherein each estimated excitation force Fei is decomposed into an estimated standard excitation force Fec corresponding to a standard servo control of the sensor and an estimated disturbance compensation excitation force Fepi, and wherein step B comprises the sub-steps of:
B1 demodulating each estimated excitation force Fei with the vibration frequency (ω) and then with the associated disturbance frequency fi to obtain an amplitude (AFpei) of said disturbance compensation excitation force Fepi,
B2 determining each respective matrix M'i on the basis of said amplitude of said force Fepi.

3. The method as claimed in claim 1, wherein step A is carried out with a plurality of electrical angles, said matrices M'i then being determined in step B by statistical filtering minimizing the contribution of a noise of the sensor.

4. The method as claimed in claim 1, wherein each representative matrix M'i determined in step B is of the form:

$$M'i = \widehat{inv(E)} \cdot Mi \cdot \widehat{inv(E)}$$

Mi defined by:

$$M1 = \begin{bmatrix} 1 & 0 \\ 0 & 0 \end{bmatrix}; M2 = \begin{bmatrix} 0 & 0 \\ 0 & 1 \end{bmatrix}; \text{ and } M3 = \begin{bmatrix} 0 & 1 \\ 1 & 0 \end{bmatrix}.$$

5. The method as claimed in claim 4, wherein the matrices $\widehat{inv(E)}$ and $\widehat{inv(E)}$ are expressed:

$$\widehat{inv(E)} = I + A$$

$$\widehat{inv(E)} = I + B$$

the three representative matrices M'i determined in step B then being expressed, disregarding the second-order terms:

$$M'i = AMi + MiB$$

and wherein step C comprises a sub-step of determining said matrices A and B on the basis of said matrices M'i.

6. The method as claimed in claim 1, wherein said disturbance frequencies fi i=1, 2, 3 are between 1000 times less and 100 000 times less than the vibration frequency (ω) of the wave.

7. The method as claimed in claim 1, wherein said frequencies fi are lower than 10 Hz.

8. The method as claimed in claim 1, wherein each disturbance PSi has an identical amplitude for all of the electrical angles.

9. The method as claimed in claim 1, wherein each estimated excitation force Fei is decomposed into an estimated standard excitation force Fec corresponding to a standard servo control of the sensor and an estimated disturbance compensation excitation force Fepi, and wherein an amplitude of the disturbance is selected such that an amplitude of the force Fepi is at least 10 times higher than an amplitude of the force Fec.

10. A method for measuring an angular velocity of a carrier on which said inertial sensor is disposed, comprising:
a phase of calibrating said inertial sensor implementing the calibration method as claimed in claim 1, said calibration phase being effected when the inertial sensor is started up,
a step D of operating said inertial sensor, wherein said stored matrices $\widehat{inv(E)}$ and $\widehat{inv(E)}$ are applied, said estimated inverse excitation matrix $\widehat{inv(E)}$ being applied to the excitation forces determined by said servo controls, prior to sending on the excitation transducers, so as to pre-compensate for said excitation forces, and said estimated inverse detection matrix $\widehat{inv(E)}$ being applied to detected movement values so as to correct said detected movement values.

11. A method for measuring an angular velocity of a carrier on which said inertial sensor is disposed, comprising:
a phase of calibrating said inertial sensor implementing the calibration method as claimed in claim 1, said calibration phase being effected when the sensor is operating, the measurement of the angular velocity then being interrupted,
a step D' of measuring the angular velocity, carried out during the calibration phase, effected by an additional inertial sensor that is also disposed on the carrier,
a step D of operating said inertial sensor, wherein said stored matrices $\widehat{inv(E)}$ and $\widehat{inv(E)}$ are applied, said estimated inverse excitation matrix $\widehat{inv(E)}$ being applied to the excitation forces determined by said servo controls, prior to sending on the excitation transducers, so as to pre-compensate for said excitation forces, and said estimated inverse detection matrix $\widehat{inv(E)}$ being applied to detected movement values so as to correct said detected movement values.

12. An inertial angular sensor comprising:
a resonator (Res) having a planar structure which is axisymmetric about two perpendicular axes x and y that between them define a sensor reference frame xy and comprising two vibrating mobile masses (M1, M2) that are disposed one around the other and that are configured to vibrate in phase opposition at a vibration frequency (ω) and along a direction x' defining a wave reference frame x'y', the vibration wave (OV) along x' forming an electrical angle (θ) with respect to the axis x, the resonator further comprising a plurality of electrostatic transducers controlled by electrical voltages and operating along at least one of the two axes x or y on at least one of the two masses,
a pair of excitation transducers (Et) to which excitation forces are respectively applied along x and y, via a plurality of excitation controls, to keep the vibration wave in a desired form and vibrating along x', and a pair of detection transducers (Dt) configured to detect movements of the vibration wave along x and y,
a pair of transducers (TQ) for compensating for a quadrature bias, which are controlled via a quadrature control CTxy, and a pair of frequency adjustment transducers (TF), which are respectively controlled via a frequency control CTx along x and a frequency control CTy along y, the three controls CTx, CTy and CTxy being termed indexed trim controlsCT, wherein CTi is indexed i with i=1, 2, 3, said excitation controls being determined by servo controls on the basis of the detected movements, the sensor operating according to a gyrometer mode, the three trim controls CTi being configured to sequentially apply a sinusoidal stiffness disturbance PSi having a disturbance frequency fi, for at least two electrical angles (θj) of the vibration wave, a processing unit (UT) configured to:

determine and store, for each applied disturbance, an estimated excitation force Fei, with i=1, 2, 3 to be applied to the resonator in the presence of said disturbance PSi, on the basis of the excitation controls determined by the servo controls, determine, on the basis of said three estimated excitation forces Fei with i=1, 2, 3 stored in the preceding step, as a function of said electrical angles and the applied disturbances, three 2×2 matrices M'i with i=1, 2, 3, each matrix M'i being representative of the response of the gyrometer to the respective disturbance PSi, determine and store an estimated inverse excitation matrix $\widehat{inv(E)}$ and an estimated inverse detection matrix $\widehat{inv(E)}$ on the basis of the three matrices M'i determined in the preceding step, an excitation matrix E and a detection matrix D being respectively representative of effects of an excitation chain and of an effect of a detection chain of the sensor, and said estimated inverse excitation matrix $\widehat{inv(E)}$ being intended to be applied to the excitation forces determined by said servo controls, prior to sending on the excitation transducers, so as to pre-compensate for said excitation forces, and said estimated inverse detection matrix $\widehat{inv(E)}$ being intended to be applied to detected movement values so as to correct said detected movement values, when the sensor is in operation.

* * * * *

UNITED STATES PATENT AND TRADEMARK OFFICE
CERTIFICATE OF CORRECTION

PATENT NO. : 12,196,576 B2  
APPLICATION NO. : 18/012963  
DATED : January 14, 2025  
INVENTOR(S) : Nicolas Vercier et al.

Page 1 of 2

It is certified that error appears in the above-identified patent and that said Letters Patent is hereby corrected as shown below:

In the Claims

In Claim 1, Column 21, Line 5, "matrix $\widehat{inv(E)}$ and an estimated inverse detection matrix $\widehat{inv(E)}$" should be -- matrix $\widehat{inv(E)}$ and an estimated inverse detection matrix $\widehat{inv(D)}$ --.

In Claim 4, Column 21, Line 31, "M'i = $\widehat{inv(E)}$.Mi. $\widehat{inv(E)}$" should be --M'i = $\widehat{inv(E)}$.Mi. $\widehat{inv(D)}$--.

In Claim 5, Column 21, Line 40, "matrices $\widehat{inv(E)}$ and $\widehat{inv(E)}$ are expressed:" should be -- matrices $\widehat{inv(E)}$ and $\widehat{inv(D)}$ are expressed: --.

In Claim 5, Column 21, Line 45, "$\widehat{inv(E)}$= 1+B" should be -- $\widehat{inv(D)}$= 1+B--.

In Claim 10, Column 22, Line 11, "matrices $\widehat{inv(E)}$ and $\widehat{inv(E)}$ are applied," should be -- matrices $\widehat{inv(E)}$ and $\widehat{inv(D)}$ are applied, --.

In Claim 10, Column 22, Line 18, "matrix $\widehat{inv(E)}$ being applied" should be -- matrix $\widehat{inv(D)}$ being applied --.

In Claim 11, Column 22, Line 31, "matrices $\widehat{inv(E)}$ and $\widehat{inv(E)}$ are applied," should be -- matrices $\widehat{inv(E)}$ and $\widehat{inv(D)}$ are applied, --.

In Claim 11, Column 22, Line 39, "matrix $\widehat{inv(E)}$ being applied" should be -- matrix $\widehat{inv(D)}$ being applied --.

In Claim 12, Column 24, Line 5, "matrix $\widehat{inv(E)}$ and an estimated inverse detection matrix $\widehat{inv(E)}$"

Signed and Sealed this  
Eighth Day of April, 2025

Coke Morgan Stewart  
*Acting Director of the United States Patent and Trademark Office*

CERTIFICATE OF CORRECTION (continued)
U.S. Pat. No. 12,196,576 B2 should be -- matrix $\widehat{inv(E)}$ and an estimated inverse detection matrix $\widehat{inv(D)}$ --.

In Claim 12, Column 24, Line 16, "matrix $\widehat{inv(E)}$ being intended" should be -- matrix $\widehat{inv(D)}$ being intended --.